June 15, 1937. S. P. MILLER 2,083,731
ABSORBENT ARTICLE SATURATING APPARATUS
Filed Nov. 1, 1932 5 Sheets-Sheet 1

June 15, 1937.  S. P. MILLER  2,083,731
ABSORBENT ARTICLE SATURATING APPARATUS
Filed Nov. 1, 1932   5 Sheets-Sheet 2

INVENTOR
Stuart Parmelee Miller
BY
ATTORNEY

June 15, 1937.  S. P. MILLER  2,083,731
ABSORBENT ARTICLE SATURATING APPARATUS
Filed Nov. 1, 1932   5 Sheets-Sheet 5

INVENTOR
Stuart Parmelee Miller
BY
ATTORNEY

Patented June 15, 1937

2,083,731

UNITED STATES PATENT OFFICE 2,083,731

ABSORBENT ARTICLE-SATURATING APPARATUS

Stuart P. Miller, Englewood, N. J., assignor to The Barrett Company, New York, N. Y., a corporation of New Jersey Application November 1, 1932, Serial No. 640,653

18 Claims. (Cl. 91—46)

This invention is directed to apparatus for saturating absorbent articles, and particularly, apparatus for continuously saturating and impregnating fibrous or other porous conduits employed to conduct and protect underground cables, telephone lines, electric light, and other conductors, and for the formation of water pipes, drain pipes to render them substantially waterproof and resistant to abrasion, corrosion, and conditions encountered above or underground by fibrous conduits. While, as above stated, the invention is particularly adapted for the saturation of fibrous conduits, it will be understood that it may be employed to saturate small fibrous or other articles requiring impregnation, such as spools, coils, etc., asbestos articles, concrete pipes, flashing blocks, etc. This application is a continuation in part of my copending application Serial No. 619,939, filed June 29, 1932, which has matured into Patent 2,012,969, issued September 3, 1935.

The article to be saturated may, of course, be prepared in any known manner. In the case of fibrous bases for conduits, newsprint and paper pulp, or other fibrous material may be beaten in the usual paper beaters and the resultant stock screened and then pumped to paper cylinder machines and there formed into wet felts or paper. The wet paper may be wound about a cylindrical or other shaped tube or mandrel to produce a wet conduit of proper thickness. This conduit may be dried in kilns to remove the major portion of its moisture content. The fibrous base may, of course, be prepared in other known manner. Such conduits are made in several sizes, commonly varying from 2 inches to 6 inches or larger in internal diameter, have an average wall thickness of approximately ⅜ of an inch and are usually produced in 5, 6, and 8 foot lengths. The wall thickness of the conduits may, of course, be greater or less than ⅜ of an inch and other dimensions may vary. As they come from the drying kilns, they usually contain from 5 to 8 per cent moisture, although considerably more than 8 per cent moisture may, on occasion, be found present.

The porosity or absorptive characteristics of the walls of fibrous conduits may vary within wide limits from a very dense wall of a density corresponding to hard wood and exceedingly difficult to saturate with low carbon water gas tar pitch or even with other waterproofing material, such as asphalt, to a porous open wall similar in density to that of roofing felt, which will readily absorb bituminous saturants. Samples of present commercial fibrous conduits have been tested and found to vary from substantially less than 1 cc. of voids per gram of tube wall to 2.8 or more cc. of voids per gram of tube wall. To determine the cubic centimeters of voids per gram of tube wall, a small sample of tube wall (say 2" x 5") is dried for one hour at 100° C., cooled, dessicated, and thereafter weighed. It is then immersed in kerosene, maintained at a temperature of 25° C., for 18 hours. Thereafter, the sample is removed from the kerosene, drained in vertical position for 30 seconds, and again weighed. The difference in weight represents the kerosene absorbed. This difference in weight in grams, divided by the specific gravity of the kerosene, corresponds to the cubic centimeters of kerosene absorbed. This volume in cubic centimeters, divided by the original weight in grams, gives the voids in cubic centimeters per gram.

It is an object of this invention to provide apparatus for saturating porous or absorbent articles in a simple and continuous manner. The apparatus of this invention is of high capacity low in operating and equipment costs, capable of automatic operation, materially reduces saturation costs, and results in uniformly saturated conduits of improved waterproofness and resistance to corrosion, abrasion, and soil pressures. Further, the apparatus is flexible and can readily be adapted to efficiently saturate articles varying widely in their porosity, e. g., dense or porous conduits, with different saturants.

As the saturant for the conduits, coal tar pitch, water gas tar pitch, asphalt, cutback pitches, blended pitches, or other waterproofing material may be used. A coal tar pitch having a melting point of from 140 to 180° F. is particularly suitable for saturation of fibrous conduits. Pitch of a melting point as high as 225° F. may be used in special cases, e. g., where conduits are to be exposed to temperatures which would soften the lower melting point pitches. Preferred pitches having melting points of from 140° to 180° F. or higher will have a "free carbon" content of from 5 to 9 per cent, but pitches of higher "free carbon" content up to from 15 to 25 per cent, or even higher may be used to give commercially satisfactory saturation under favorable conditions, e. g., in saturating articles having comparatively open wall structure.

Preferably, coal tar pitch made by a vacuum distillation process, such for example as disclosed in Patent No. 1,759,816, granted May 20, 1930, or other processes minimizing decomposition of the tar undergoing distillation, is employed as the saturant. Pitches made by a low temperature vacuum distillation process are characterized by low "free carbon" content as compared with pitches made by higher temperature processes from the same tar, and I have found that such pitches are particularly suitable as the saturant for fibrous conduits.

Besides waterproofing absorbent articles such as conduits, this invention may be employed in fireproofing, oil proofing, gas proofing, insulating, painting and coloring such articles. For example, in fireproofing an article, it may be impregnated with an aqueous solution of inorganic salts, e. g., solutions comprising inorganic phosphates, in oil proofing a resin or cellulose solution may be used, in gas proofing and insulating the articles may be saturated with resin, cellulose or rubber mixture and in painting and coloring the articles may be impregnated with paints, lacquers, enamels or varnish.

In accordance with a preferred embodiment of this invention a saturating tank of a height sufficient to accommodate a maximum barometric column of saturant and provide a space thereabove is disposed within the container for the saturant so that the lower open end of the tank is immersed in the saturant in the container and thus liquid sealed against the atmosphere. An endless conveyor provided with suitable holders for the conduits is arranged to pass into the saturant in the container through the liquid seal at the base of the saturating tank up through the column of saturant therein, if desired, into the evacuated space above the column of saturant down through the barometric column of saturant through the liquid seal at the base of the saturating tank into the saturant in the container and out from the container back to the entrance point of the conveyor into the saturant in the container.

In the preferred embodiment illustrated in the drawings, the invention is shown incorporated in the production of fibrous conduits saturated with bituminous material and the present disclosure will be confined to the present illustrated embodiment of the invention. It will be understood, however, that the novel features and improvements are susceptible to other applications, such, for example, to apparatus for saturating articles generally. Included in the scope of my invention is apparatus for saturation of conduits made of cement, concrete, cement-asbestos mixtures, or other porous or absorbent articles capable of being saturated. Hence, the scope of this invention is not confined to the specific embodiment herein described.

In the drawings, in which like reference numerals designate like parts,—

Figures 1, 2, 3, 4:
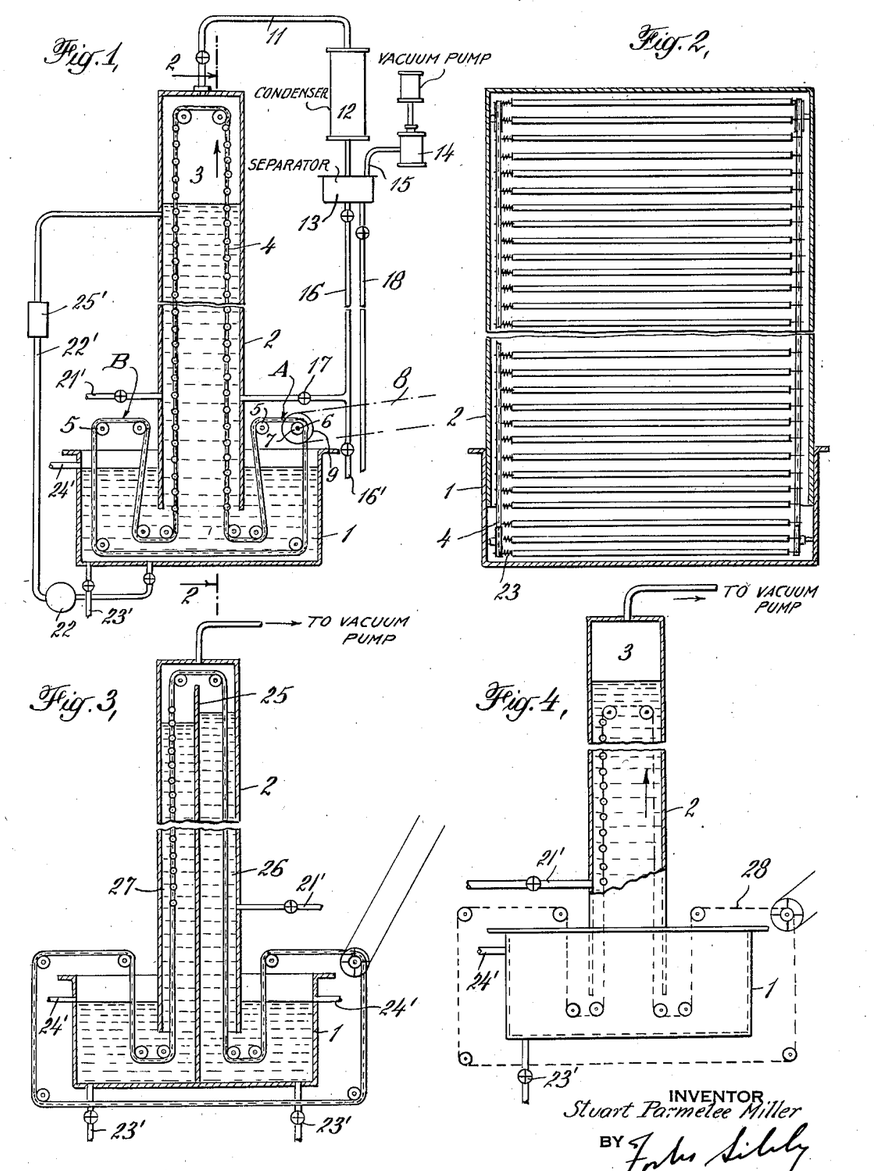
Fig. 1 is a vertical section, partly in elevation, through a saturating tank for practicing the process of this invention.
Fig. 2 is a vertical section view taken on the line 2—2 of Fig. 1, showing the conveyor for carrying individual conduits in horizontal position through a barometric column of saturant.
Fig. 3 is a vertical section through a modified form of apparatus for practicing the invention; the saturating apparatus of this figure involves a partition dividing it into two sections.
Fig. 4 shows a further modified form of apparatus for practicing the invention. In the modification of this figure, the conveyor for carrying the conduits through the column of saturant does not pass into the evacuated space thereabove.

In the drawings, Fig. 1 reference numeral 1 indicates a container of sufficient capacity to hold the saturant required in the saturating process. Disposed within the container is a tank 2 of a height sufficient to accommodate a barometric column of saturant and leave a space 3 of substantial extent in the top of tank 2. The base of tank 2 is open and extends below the level of saturant in container 1 so that a liquid seal is provided at the base of the saturating tank. A conveyor chain or belt 4 passes about guide sprockets or pulleys 5 suitably mounted. Pulley 6, over which the chain or belt 4 passes, is mounted on a driven shaft 7. Shaft 7 may be driven by means of belt 8 passing over pulley 9 fixed to shaft 7 or through other suitable driving mechanism.

A valve-controlled pipe 11 leads from the top of saturating tank 2 through a condenser 12 into a separator 13. Condenser 12 condenses any oil vapors coming off from the saturant and reduces the volume of gas and water vapor handled by vacuum pump 14 communicating through pipe 15 with the trap 13. A pipe 16 connects the separator 13 with the saturating tank 2 to return, if desired, distillate oil in the separator 13 to the tank 2. Valve 17 in pipe 16 controls flow therethrough. A valve-controlled pipe 18, of a length sufficient to accommodate a barometric column of water, leads from separator 13 permitting disposal of the water content of the separator 13 to a suitable point. Valve-controlled pipe 16' communicates with pipe 16 for withdrawing oil from the separator 13 when it is not desired to return it to the tank 2. Fresh saturant is added continuously to replace the saturant absorbed by the conduits so that the volume of saturant within the system is maintained substantially constant. The amount of saturant fed to the tank must be such that the level of saturant in container 1 is maintained at a height above the base of tank 2 so that the liquid seal at the base of the tank is not broken. Pump 22 in line 22' connecting container 1 with tank 3 may be employed to circulate the pitch within the system and thus maintain it of substantially uniform viscosity and free carbon content throughout the tank 2 and container 1. A strainer 25' of any well known type is preferably disposed within the circulating line 22' to keep the pitch circulated through tank 2 and container 1 free of solid impurities. The strainer may be in the line preceding or following the pump 22. Tank 2 may be provided with a valve-controlled saturant supply line 21' and container 1 may be provided with a valve-controlled drawoff 23' and an overflow pipe 24' communicating with a storage tank (not shown).

Fig. 2 shows a front elevation of the conveyor chains carrying individual fibrous conduits through the saturant. Chains 4 are disposed on opposite sides of tank 2 and are provided in this example with spring pressed pins 23 extending within the conduits and supporting the same. If desired, the driving mechanism for conveyors of this figure and the other figures may be such that the conveyor may be reversible, i. e., driven either from left to right or right to left through the saturant.

Tanks 1 and 2 may be equipped with suitable heating elements, such as steam jackets or coils, regulators of well-known type for maintaining and controlling the temperature and vacuum. The apparatus may be suitably heat insulated to reduce heat losses. For the sake of clearness, insulation, heating elements, and regulators have been omitted from the drawings.

Instead of affixing individual conduits to the conveyor chains, the latter may be provided with baskets or holders arranged to support the tubes or conduits in vertical, horizontal or other position. If it is desired to maintain the conduits in vertical position without reversal, the baskets may be suspended from the conveyor so that the conduits are maintained upright in both the up and down passage through the column of saturant, as hereinafter more fully pointed out. As an alternative, the baskets may be mounted on the conveyor so that when the direction of travel of the basket changes from upward to downward through the saturant, the basket is turned 180°, the top of the tubes during upward travel becoming the base of the tubes during the downward passage. Operation in the latter manner insures uniform saturation of the tubes from end to end. The baskets may be fixed to the conveyor or detachably secured thereon. In the former case, the conduits or tubes may be inserted in the baskets prior to the passage thereof into the saturant. For this purpose, the conveyor may be momentarily stopped or the conveyor may be caused to pass through an extended path prior to its passage into the saturant during which the conduits may be inserted in the basket. If the baskets are detachably secured to the conveyor, one basket containing saturated tubes may be removed at one point in the system while a basket containing unsaturated tubes secured to the conveyor at another point in the system, the conveyor being, if desired, momentarily stopped to permit the removal of the baskets from and attachment to the conveyor, or the baskets may be detached from and attached to the moving conveyor. For this purpose automatic pick up and drop mechanism for conveyor baskets of any well-known type may be employed. The baskets may be formed with projections or other members for spacing the tubes so that the tubes do not touch one another, thus insuring improved saturation. Also quick-opening basket doors may be provided permitting prompt loading and discharging of the conduits into and from the baskets. The conveyor may be of any suitable type, e. g., chain, cable, belt, apron, etc.

In the operation of the apparatus of Fig. 1, the pitch is maintained in the saturating tank in fluid condition. Saturating fibrous conduits having approximately 1.6 cc. of voids per gram of tube wall with coal tar pitch of specific gravity of 1.2 and a melting point of about 160° F., the pitch may be maintained at a temperature of about 320° F. while a vacuum of from 27 to 29 inches of mercury is maintained in the evacuated space above the surface of the column of pitch. The height of the tank 2 above the atmospheric pitch level in 1 with such pitch should be approximately 38 feet providing for an evacuated space of approximately 10 feet above the maximum barometric column of pitch. To accommodate variations in atmospheric conditions, different specific gravity pitches, etc., a minimum clearance of 2 feet should be provided.

The basket or holder containing tubes or individual tubes, as shown in Fig. 2 may be affixed to the conveyor at a point to the right of tank 2, indicated by the reference numeral A (Fig. 1). The tubes will travel downwardly through the pitch under the sealing edge of the tank and will then gradually move upwardly through the column of saturant. Hence, the tubes are at first submitted to saturant at atmospheric pressure then to saturant at somewhat above atmospheric pressure and then gradually rise in the column, the head of saturant on the conduit walls being gradually reduced. Consequently, as the tubes pass through the initial stages of the saturating process more and more moisture and gas are removed from the tube walls and more and more pitch flows into the voids in the walls. Finally, the tubes leave the pitch and are subjected to the vacuum in space 3. This effects withdrawal of maximum amounts of residual air and water possible under equilibrium conditions existing in the evacuated space which, it will be noted, are favorable to substantially complete removal of air and other gas and vapor from the tube walls. Deposits of free carbon, etc., will also be loosened and in fact removed in space 3. Thereafter, the tubes reenter the saturant and move downwardly therethrough, being subjected to gradually increasing pressure heads of pitch as they move downwardly. Upon reentry of the tubes into the pitch, the voids evacuated as a result of exposure to vacuum in space 3 are filled. The gradual pressure increase on the conduit walls due to downward movement through the column of saturant results in maximum amounts of saturant entering the conduits.

From the bottom of the column of saturant, conveyor 4 carries the tubes out of the saturating bath as indicated by the reference character B (Fig. 1). The saturated conduits may here be removed from the conveyor for draining and cooling.

The apparatus of Fig. 3 differs from that of Fig. 1 chiefly in that a partition 25 extends up from the base of container 1, into tank 2 to a point above the level of saturant and somewhat below the top of tank 2 dividing the tank 2 and container 1 into two compartments, 26 and 27. Pitch or other saturant of one characteristic, i. e., temperature, melting point, or type of saturant may be introduced into compartment 26 and saturant of a different characteristic placed in compartment 27. For example, a low melting point, relatively high penetrability pitch may be placed in compartment 26 to insure maximum penetration and a higher melting point pitch placed in compartment 27 to provide a seal coat about the conduit. In draining such seal coat will be left on the surface of the product since the high melting point pitch will not drain off as completely as the low melting point pitches. The temperature of the saturant may be maintained at any desired point and the temperature at the base of tank 2 may be lower or higher than that at the top of the tank.

Figure 5:
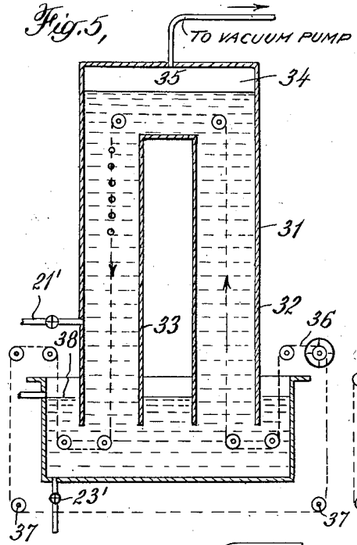
Fig. 5 shows a further modified form of apparatus for practicing the invention involving a U-shaped column of saturant maintained under vacuum through which the conduits are passed.
Figures 6, 7:
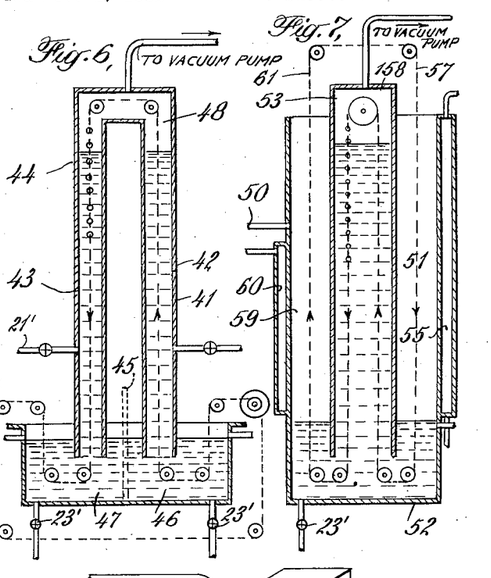
Fig. 6 shows a modified form of saturating bath in which different types of saturant may be employed during the saturation operation.
Fig. 7 shows an arrangement of apparatus for practicing the process of this invention involving a heating zone contiguous to the entrance of the conduits into the saturating bath and a draining compartment contiguous to the point of exit of the conduits from the saturating bath.

In Fig. 4 is shown apparatus for saturating fibrous conduits or other absorbent material in which a conveyor 28, shown somewhat diagrammatically, is so disposed that it does not carry the conduits into the evacuated space 3 above the level of saturant but maintains the tubes or conduits immersed throughout their passage through the barometric leg of saturant in tank 2.

Where it is desired to maintain in the saturating zone minimum amounts of saturant, apparatus such as shown in Figs. 5 and 6 may be employed. In Fig. 5 a U-shaped tank 31 is suitably supported with the open legs of the tank 32, 33, disposed within the saturant in container 1. Thus a liquid seal is maintained about the legs 32, 33 in tank 31. The tank is of a height such that a maximum barometric column of saturant may rise into the legs of the tank and partially fill portion 34 connecting the legs leaving a space 35 above the level of saturant. A conveyor 36 passing over suitable guide pulleys or sprockets 37 travels up through leg 31, through portion 34, down through leg 33, leaving the tank at 38. As in the case of the apparatus of Fig. 4, the material to be saturated throughout its passage through the saturant is shown as being maintained immersed and is not moved into the evacuated space above the level of the saturant. By enlarging space 35, provision may be made for allowing the conduits to leave the saturant and enter the vacuum space above.

In the apparatus of Fig. 6, a U-shaped tank 41, corresponding to tank 31 but of somewhat greater height, is utilized. Tank 41 is of such height that when vacuum is created therein maximum barometric columns of saturant rise in the legs 42, 43 thereof, the level of saturant indicated by the line 44 being below the top of legs 42, 43 of the tank. A partition 45 may, if desired, be disposed in container 1 to divide it into two portions 46, 47, which may, if desired, contain saturants of different characteristics. In the apparatus of Fig. 6, the conveyor carries the material to be saturated first through the saturant in leg 42, then into the U-shaped evacuated space 48, and then downwardly through the saturant in leg 43.

The apparatus of Fig. 7 involves a heating zone 51 positioned above the pitch in container 52. This container is made of sufficient capacity to hold the entire amount of saturant required in the practice of the process; that is to say, if for any reason the vacuum in tank 53 should break, the saturant will flow into and be retained in container 52. The heating zone 51 may be heated, e. g., by steam jacket or other heating chamber 55 surrounding a portion of vertical wall of container 52 above the level of saturant therein, or other heating means, e. g., steam pipes, may be used. The conduits or tubes may be affixed to conveyor 56 at the top thereof as indicated by reference numeral 57, then carried by the conveyor through the heating and drying zone 51 into the saturant in container 52, under the seal formed by base portion of tank 53 disposed below the level of saturant in container 52, thence up into the barometric leg of saturant into the evacuated space 58, down through the barometric leg of saturant and finally up through the draining zone 59. The draining zone 59 may be suitably heated as for example by steam jacket 60 and/or cooled as for example, by the passage of air or inert gas therethrough. Pipe 50 communicating with the upper portion of zone 59 may be employed to introduce cool air or other gas thereinto. The conduits may be removed from the conveyor at 61.

Figures 8, 9:
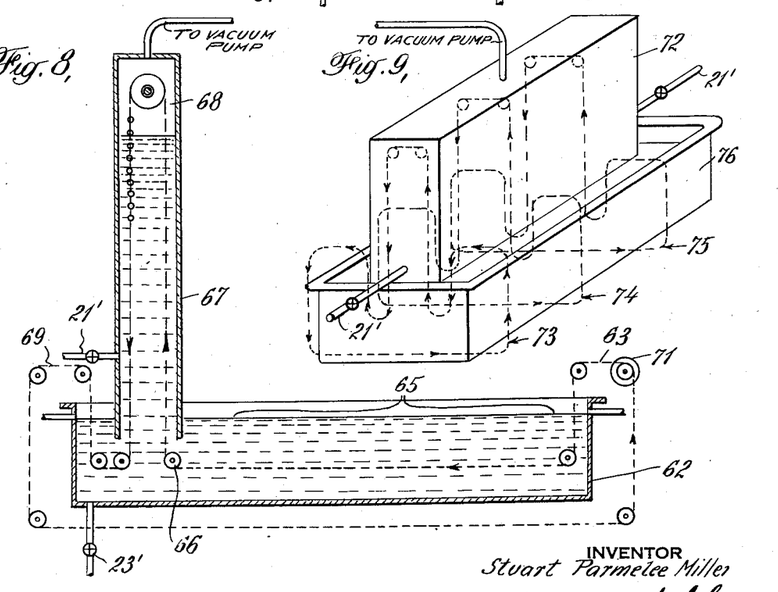
Fig. 8 shows an arrangement of apparatus for practicing this invention involving an elongated container for the saturant through which the conduits may be passed and thus dried.
Fig. 9 shows an arrangement of saturating apparatus for practicing the process of this invention involving a plurality of conveyors for carrying articles through the saturating bath.

Instead of drying the conduits by passing them through a heating zone out of contact with the saturant they may be dried by immersion in hot saturant prior to passage up through the barometric leg of saturant maintained in the saturating tank. Apparatus such as shown in Fig. 8 may be employed for drying the conduits by passage through a bath of saturant. In this figure, reference numeral 62 designates an elongated container or kettle for the saturant. Container 62 may be covered or provided with means for removing fumes. Conveyor 63 is disposed to immerse the conduits carried thereby at 64 and to carry them while immersed through the extended path 65. Upon leaving the path 65 at 66, the dried conduits pass up through the barometric leg of saturant in tank 67 into the evacuated space 68 above the level of saturant therein, then down through the barometric leg of saturant, the saturated conduits being removed from the conveyor at 69. The wet conduits may be placed on a conveyor manually or automatically at a point indicated by reference numeral 71. Batches of conduits may be immersed in the saturant and thus dried and the dried conduits continuously passed through the barometric leg of saturant and thoroughly impregnated. That is to say, the drying may be batchwise followed by the continuous saturation of the dried conduits.

In the modifications hereinabove described, each saturating tank is provided with but one conveyor passing therethrough. Fig. 9 shows, somewhat diagrammatically, an arrangement of saturating tank and container for saturant involving the passage of three conveyors through the saturant in tank 72. This tank may, of course, be made of any desired size to accommodate any number of conveyors. Tank 72 it will be noted from Fig. 9, is relatively long and narrow. At spaced points along the length of the tank, conveyors 73, 74, and 75 are disposed and are arranged in parallel. Each conveyor passes, as indicated by the arrows, into the saturant maintained in tank 76 under the seal created by extension of the base of tank 72 below the level of saturant maintained in container 76 up through the barometric leg of saturant, into the evacuated space thereabove, down through the leg of saturant and finally out of the container at the side opposite to its entry into the container. The conveyors may be disposed so that they maintain the conduits carried thereby continuously immersed in saturant during their passage through the barometric leg of saturant as disclosed in Fig. 4, showing a saturating tank having a single conveyor passing therethrough.

Figure 10:
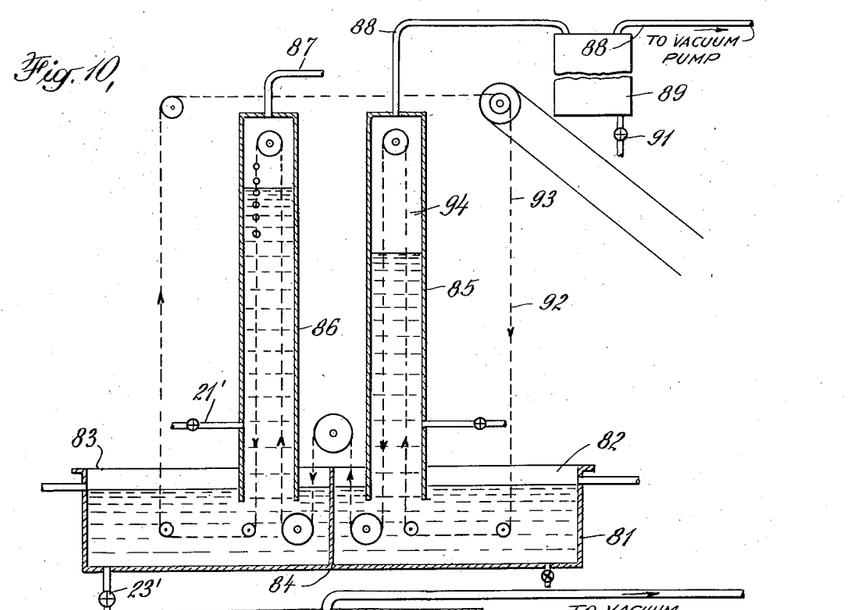
Fig. 10 shows an arrangement of apparatus for practicing the process of this invention involving two separate columns of saturant, each maintained under vacuum.

For the saturation of conduits containing excessive amounts of moisture, apparatus such as shown in Fig. 10 is advantageously employed. The saturating tank of this figure is relatively long and is divided into two compartments, 82 and 83, by a partition 84. Two saturating tanks, 85 and 86, are disposed in compartments 82 and 83, respectively, with their inverted ends positioned beneath the level of saturant in container 81. The tops of both tanks 85 and 86 communicate with separate vacuum pumps (not shown) through lines 87, 88, respectively. If it is desired to maintain the same vacuum in both tanks, lines 87 and 88 may communicate with one and the same vacuum pump. A foam catcher or chamber 89, provided with a valve-controlled draw-off 91, is disposed in line 88, leading from tank 85 to the vacuum pump. The conduits affixed to conveyor 92, passing through the apparatus as indicated somewhat diagrammatically in Fig. 9, at a point designated by reference numeral 93, are carried first up through the column of saturant in tank 85 into the evacuated space 94 above the level of saturant. Foam caused by the water content of the conduits is drawn off through line 88 and collected in tank 89. After passage through the column of saturant in tank 85, the conduits are passed into the saturant in compartment 83, up through the barometric leg of saturant in tank 86, and completely saturated as hereinabove described in connection with the apparatus of Fig. 1. Tank 85 may be made higher than tank 86 so that the conduits are carried through the vacuum space 94 for a considerable period, hence, completely evacuating the pores and voids. A relatively low vacuum may be maintained in tank 85 when excessively wet conduits are treated, thus avoiding undue foaming. If the vacuums maintained in tanks 85 and 86 are different, the levels of liquid therein will be different as shown in the drawings. The saturant placed in compartment 82 and tank 85 may be different from that employed in compartment 83 and tank 86.

Figure 11:
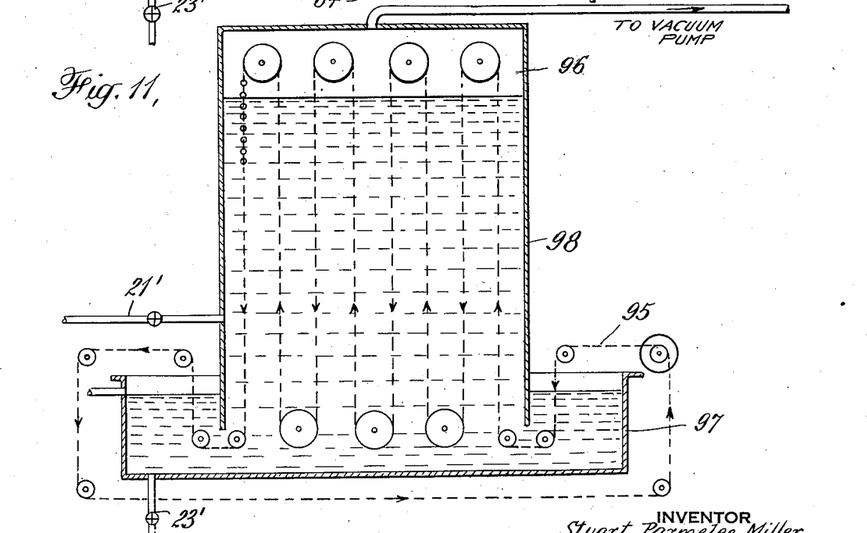
Fig. 11 shows apparatus for practicing the process of this invention involving a multiple pass of the conveyor carrying the articles to be saturated through the saturating bath maintained under vacuum.

In saturating dense fibrous tubes, for example tubes having less than 1 cc. of voids per gram of tube wall, apparatus such as shown in Fig. 11 may advantageously be utilized. In the apparatus of this figure, a conveyor 95 makes several passes up through the saturant into the evacuated space 96 thereabove and then again down through the saturant. The conveyor in the tank may be so arranged that it does not pass into the evacuated space 96, as shown in Fig. 11, but maintains the conduits immersed throughout their passage through the barometric leg of saturant as in the case of the apparatus of Figs. 4 and 5. In the case of the apparatus of Fig. 11, the conduits while immersed in the saturant at the base of the column are subjected to a pressure somewhat above atmospheric pressure, and when near the top of the saturant, are subjected to high vacuum. When removed from the pitch into the evacuated space 96, they are subjected to high vacuum out of contact with the saturant. The combination of long time immersion and the pulsation of saturant into and out of the side walls as the conduits progress through the cycle will yield tubes thoroughly saturated with pitch or other saturant uniformly distributed throughout the walls. It will be understood that the number of passes of the conveyor through container 97 and tank 98 of Fig. 11 may be whatever desired.

A second container (not shown) may be placed contiguous to the containers for saturant depicted in the various figures of the drawings and the conveyors arranged to pass through the second container. This second container may contain saturant at a temperature higher than that in the first container. As the saturated conduits are passed through the saturant in the second container they are washed free of lint, carbon, or other impurities.

A draining conduit or passage such as 59 of Fig. 7 may be associated with the saturating tanks of the other figures. In the case of Fig. 7, this draining passage is shown in vertical position. It may, however, be placed in a horizontal direction or direction inclined to the horizontal and the conveyor carrying the saturated conduits caused to pass therethrough. The draining chamber or passage may be heat insulated and equipped with heating elements and/or cooling means.

After or during draining, the saturated conduits may be moved through cooling chambers or tunnels. Cooling equipment of any well-known type may be associated with such chambers or tunnels or inert gas or air circulated therethrough to expedite cooling of the conduits.

Figures 12, 13, 14, 15, 16, 17, 18, 19:
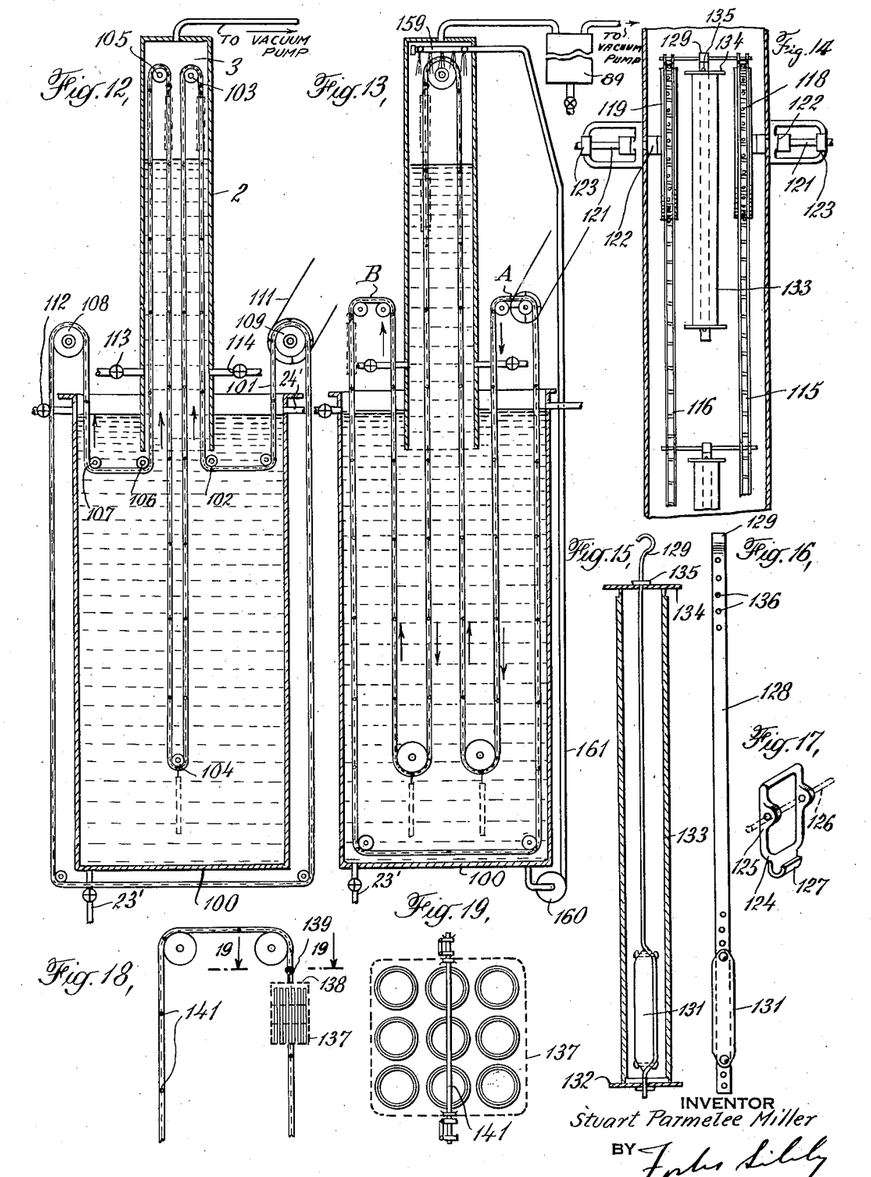
Fig. 12 shows a further modified form of apparatus involving a deep body of saturant through which the conduits may be passed and subjected to substantial pressure heads of saturant.
Fig. 13 shows a further modified form of apparatus involving a deep body of saturant through which the conduits may be passed and depicts individual holders for the conduits, maintaining them in a vertically suspended position throughout the travel of the conduit through the saturant.
Fig. 14 is a fragmentary vertical section taken on the line 14—14 of Fig. 13, partly in elevation, on an enlarged scale as compared with Fig. 13, and shows the mounting for the sprockets over which the conveyor chains pass.
Fig. 15 shows an elevation of one of the conduit holders, the conduit being shown in vertical section.
Fig. 16 is a front elevation of the conduit holder.
Fig. 17 is a perspective view of a link of the conveyor chain, the link shown carrying a pin from which a conduit holder may be suspended.
Fig. 18 is a fragmentary view somewhat diagrammatic in character, showing the suspension of a basket of conduits from a conveyor chain.
Fig. 19 is a plan view of one of the baskets containing conduits taken in a plane passing through line 19—19 of Fig. 18.

In the apparatus of Fig. 12 container 100 is made relatively deep—50 or 60 feet, or deeper. Tank 2 is disposed within tank 100 as in the other modifications, so that a barometric column of saturant rises in this tank. Conveyor 101 is arranged to travel over sprockets 102 up through the barometric column of saturant into the evacuated space 3 above the column of saturant about sprocket 103 down through the barometric column of saturant, passing into the saturant maintained in tank 100. At a suitable point in the base of the tank the conveyor 101 passes over a sprocket 104 up through the saturant in tank 100 into the barometric column entering the evacuated space 3 and passing over sprocket 105 down through the barometric column. The conveyor belt then passes about sprockets 106, 107, 108 and 109 back to sprocket 102. Sprocket 109 is driven by means of a chain 111 or other drive.

As in the case of the other modifications, tank 100 is provided with the valve control drawoff 23' and an overflow pipe 24' communicating with a tank (not shown). The saturant may be fed to tank 100 through valve control pipe 112. Additional inlets for saturant are shown at 113 and 114.

As the conduit is gradually lowered into the tank 100, the pressure head of saturant thereon gradually increases. Thus, for a tank approximately 50 feet deep the conduit is first subjected to atmospheric pressure, and upon immersion in the saturant, to a pressure slightly above atmospheric. As the conduit is gradually moved up through the saturant in column 2, the pressure is gradually relieved until the conduit reaches the evacuated space 3 at which point it is subjected to vacuum out of contact with the body of saturant. Thereafter the conduit is gradually moved lower and lower into the column of saturant, and the pressure gradually increases, reaching atmospheric, when the conduit nears the base of tank 2. Continued downward movement causes increasing head of pressure upon the conduit walls until the conduit is at its lowermost point, where it is subjected to a pressure head of about 50 feet of saturant, assuming the tank 100 to be somewhat over 50 feet deep. During the upward movement of the conduit this pressure is gradually reduced. The gradual change in pressure, I have found, results in maximum impregnation of the conduit walls.

Figs. 13 to 17 show saturating apparatus of the same general type as described in connection with Fig. 12 but depict in greater detail one form of suspension device of individual conduits. As in the case of Fig. 12, container 100 for saturant is of relatively great depth to permit immersion of the conduits in the saturant to subject them to pressure heads of saturant of the order of 50 feet or more.

As appears from Fig. 14, the conveyor for moving the conduits through the saturant involves two chains 115 and 116 arranged in spaced relation and disposed to pass over pairs of spaced sprockets. Two such sprockets 118 and 119 are shown at the top of Fig. 14. These sprockets are rotatably mounted on stub shafts 121 extending through stuffing boxes 122 in the walls of tank 2 and rotatably mounted in suitable bearings 123. The chains 115 and 116 may be composed of usual links employed in chain conveyors. At spaced intervals special links, such as, for example, link 124, shown in perspective in Fig. 17, are inserted in both chains. Links 124 have apertured ears 125 extending upwardly at both sides thereof. A pin 126 is designed to pass through the apertures in ears 125. This pin extends across the space between the conveyor chains 115 and 116 and passes through the ears of the links 124 of both chains. The links are formed at one end with a hooked portion 127 for engagement with a succeeding link of the chain.

One form of container or holder appliance for individual conduits is shown in Figs. 15 and 16. This holder comprises a strap or rod 128 formed at one end with a hook 129 and weighted at the other end, as indicated by the reference numeral 131. Suspended from the weight 131 is a perforated plate or narrow strap 132 designed to engage the lower end of the conduit shown in section and indicated by the reference numeral 133. The upper end of the conduit is engaged by a perforated belt or strap 134 which may be locked in position on the rod 122 by cotter pin 135 through one of a series of apertures 136 formed in the rod 128. The plurality of apertures in rod 128 permits accommodation of one and the same holding appliance to different length tubes. In operation the tube or conduit is passed over the hooked rod 128 with its lower edge resting on base plate 132. The upper member 134 is then applied and locked in position by pin 135, thus securely holding the tube 133 in vertical position. Any other type of holder for tubes may, of course, be employed.

The holders containing the tubes are suspended from pin 126 at the point indicated by the reference numeral A in Fig. 13, hook 129 engaging pin 126, as appears in Figs. 13 and 14. The tubes are maintained in vertical position with the same end lowermost during the four passes thereof through the saturant in tank 2. The weight 131 minimizes and tends to prevent oscillatory movement of the tubes during the passage through the saturant. Removal of the saturated tubes from the conveyor chain may be accomplished either automatically or manually at the discharge point indicated by the reference numeral B.

As indicated in Fig. 13, the top of the tank is communicably connected with a foam chamber similar to foam chamber 89 of Fig. 10. A vacuum pump is connected to this foam chamber to maintain vacuum conditions therein and in the tank containing the saturant.

Figs. 18 and 19 show one type of mounting for baskets containing tubes. When saturating tubes of different internal diameters, the tubes of smaller diameter may be nested within the larger tubes and the assembly of nested tubes placed within a basket such as 137 of Fig. 18. This basket may be perforated or made of suitable mesh material and is provided with a removable cover 138 having a hook 139 arranged to engage a pin 141 corresponding to pin 126 of Fig. 14. Detents or other fasteners (not shown) which may be spring actuated, are provided on the sides of the baskets, securely locking the perforated or foraminous cover thereon. As in the case of the individual conduit holders of Fig. 13, the basket of conduits of Figs. 18 and 19 are suspended from the pins extending across the space between the conveyor chains and are maintained with the same end lowermost throughout the passage of the conduits through the up and down passes through the saturant.

Figure 20:
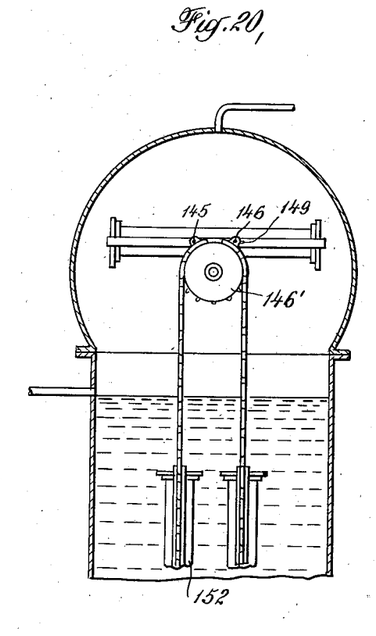
Fig. 20 is a fragmentary vertical section through the top portion of the saturating tank, parts being shown in elevation, and shows apparatus for saturating conduits in which the conduits are reversed during their travel through the space above the column of saturant.
Figures 21, 22:
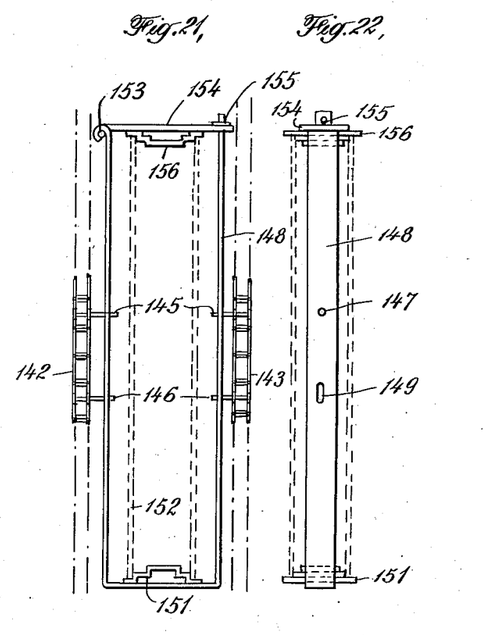
Fig. 21 is a fragmentary elevation of a view of the conveyor chain and one of the conduits carried thereby mounted for reversal as in the case of Fig. 20.
Fig. 22 is a front elevational view of the strap holder of Fig. 21, the conduit being shown in section.

Figs. 20 to 22 show an arrangement of apparatus for end to end reversal of the conduit during its passage through the evacuated space above the column of saturant. Thus the base end of the conduit passing up through the column of saturant becomes the top end during the downward passage of the conduits through the saturant. The conveyor of Figs. 20 and 21 involve spaced chains 142—143, preferably of the link type passing over suitable sprockets, one of which, indicated by the reference numeral 146, is shown in Fig. 20. Certain links of the chains are provided with apertured ears through which extend pins 145 and 146 arranged in pairs disposed opposite each other as shown in Fig. 21. Pins 145 are designed to enter into and snugly fit within openings 147 in the strap member 148 constituting a holder for the individual conduits, as will be more fully described hereinafter. Pins 146 pass into elongated openings 149 providing a lost motion connection between pins 146 and strap member 148, and thus permit the necessary movement of the pins with respect to the conduit holders as the conduits pass about the sprockets.

Strap member 148 has welded, or otherwise suitably secured thereto a stepped base member 151 for reception of the lower end of the tube or conduit shown in section and indicated by the reference numeral 152. Pivoted to the top of the strap member 148, as at 153, is one end of a cover member 154. The other end of this cover member is arranged to be locked to the strap member by a cotter pin 155 or other suitable locking device. A stepped member 156 is suitably secured to the cover plate 154. The stepped members 151 and 156 permit the employment of the tube holder with tubes of different internal diameters and at the same time securely hold the tubes in desired position within the holder.

Baskets containing a plurality of tubes may be mounted, as shown in the case of the individual holders of Figs. 20 to 22, and the baskets containing conduits thus reversed during their travel between up and down passes through the saturant.

During the passage of the conduits through the evacuated space 3, the conduits may be showered with saturant by means of sprays disposed in the top of space 3. Such sprays are indicated by the reference numeral 159 in Fig. 13. It will be understood, that if desired, sprays may be provided in the corresponding evacuated spaces of the other figures of the drawings and that saturant may be pumped from the base of the container to the sprays by a pump 160 in line 161, communicating with spray head 159, as shown for example in the case of the apparatus of Fig. 13.

Figure 23:
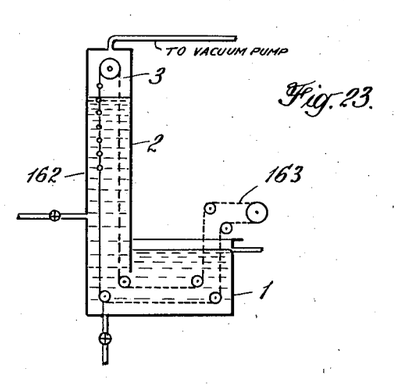
Fig. 23 is a diagrammatic view of a further modified form of apparatus for practicing the invention. In the apparatus of this figure the conduit load and discharge stations occur on the same side of the container and not on opposite sides as in the case of the apparatus of Fig. 1.

Instead of having the loading and discharge stations on opposite sides of the saturating tank, these stations may be disposed on one and the same side. Such apparatus is shown in Fig. 23 in which one side only of saturating tank 2 dips into the saturant in container 1, the back or opposite side of tank 2 indicated by the reference numeral 162 being continuous with the back of container. Both the loading and the discharging of the conveyor takes place at the side indicated by the reference numeral 163. The conveyor carries the fibrous conduit first into the saturant in container 1, up through the saturant in tank 2, into the evacuated space 3, down through the saturant in tank 2, back through the saturant in container 1, and out of the saturant at the side 163 where it entered the saturant.

Figure 24:
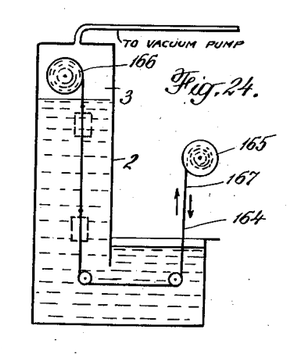
Fig. 24 is a diagrammatic view of a further modified form of apparatus embodying this invention.

In Fig. 24 is shown apparatus involving a conveyor composed of a chain or belt 164 running from one winch or drum 165 suitably mounted exteriorly of tank 2 to a second winch or drum 166 rotatably mounted in vacuum space 3 in tank 2. The drums are provided with suitable mechanism (not shown) for rotating them in both clockwise and counterclockwise directions. Baskets of conduits or individual conduits may be suspended from the chain or belt at a point indicated by the reference numeral 167 and the drums rotated to move the conduits into and through the saturant, and if desired into the evacuated space thereabove. Upon reversal of rotation of the drums 165 and 166, the conduits may be removed from the saturant.

Prior apparatus for saturating conduits required the handling of from 400 to 600 tons of saturant in the system. The apparatus of this invention, for corresponding capacity, will require the use of less than 100 tons of saturant, and consequently materially reduce the amount of saturant that must be kept in storage and permits relatively more rapid renewal and freshening of the saturant.

The term "continuous" is used in the specification and claims in a broad sense and is intended to differentiate the process of this invention from batch processes involving the drying of conduits in suitable apparatus, followed by the saturation of the dried conduits, the apparatus throughout the period required for drying and saturation being employed to dry and saturate one and the same batch of conduits. By the term "continuous" as used herein, it is intended to include the passage of conduits or other articles to be saturated intermittently, i. e., step-by-step, through the drying and/or saturation zones, the material remaining at rest for predetermined periods of time in its passage therethrough, as well as the non-stop passage of the material through the drying and/or saturation zones.

By the term "maximum barometric column" as used herein is meant the maximum column of saturant obtainable with the vacuum conditions employed in the saturating tank, irrespective of variations in atmospheric pressure conditions.

It will be noted that the apparatus of this invention is continuous, of high capacity, capable of automatic regulation, requires a minimum of saturant for its operation and results in uniformly saturated conduits of improved waterproofness.

It is to be understoood that this invention is not restricted to the present disclosure otherwise than defined by the appended claims.

I claim:

1. In apparatus for saturating porous conduits, in combination, a container for saturant, a tank of a length sufficient to accommodate a maximum barometric column of saturant with an evacuated space thereabove, said tank being open at one end and closed at the other and having the open end immersed in the saturant in the container and thus liquid-sealed against the atmosphere, a vacuum pump communicating with the top of said tank, an endless conveyor provided with holders for the porous conduits arranged to pass through the saturant in said container, through the seal, up through the saturant in said tank, into and through the evacuated space thereabove, down through the saturant in said tank, and into and out of the saturant in said container, and means for spraying the porous conduits while in the evacuated space.

2. In apparatus for saturating long inflexible absorbent articles, in combination, an elongated container for saturant providing an extended path of travel through the saturant for the articles to be saturated, a tank having one end open and the opposite end closed disposed with its open end immersed in the saturant in said container, at the end of said extended path, said tank being of a height sufficient to accommodate a maximum barometric column of saturant with an evacuated space thereabove, means for creating a vacuum in said tank, and a conveyor for the articles to be saturated disposed to pass through said extended path, into said tank, through the evacuated space therein, and out from said tank.

3. In apparatus for saturating wet fibrous conduits, in combination, a container for saturant, a partition dividing the container into two compartments, two tanks, each of a height sufficient to accommodate a maximum barometric column of saturant and having one end closed and the other open, disposed with the open ends immersed in the saturant in the two compartments, each tank being individual to a compartment, means for creating a vacuum in each of said tanks, a foam chamber communicating with one of said tanks, and means for passing the wet conduits, first through the tank communicating with the foam chamber, then into and through the saturant in the other tank.

4. In apparatus for saturating wet fibrous conduits, in combination, a container for saturant, a partition dividing the container into two compartments, two tanks, each of a height sufficient to accommodate a barometric column of saturant with an evacuated space thereabove and having one end closed and the other open, disposed with the open ends immersed in the saturant in the two compartments, each tank being individual to a compartment, a foam chamber communicating with one of said tanks, an endless conveyor for the wet conduits arranged to pass through the saturant in one compartment, into the saturant in the tank communicating with the foam chamber, through the evacuated space therein, into and through the saturant in the other compartment, into and through the saturant in the other tank, and out through the saturant in said other compartment, and means on said conveyor for holding the conduits in vertical position as they are carried through the saturant.

5. In apparatus for saturating long inflexible absorbent articles, in combination, a container for saturant, a tank open at one end and closed at the other and of a length sufficient to accommodate a maximum barometric column of saturant, said tank being disposed with its open end disposed in the saturant, means for creating a vacuum in said tank, a conveyor for carrying articles passing into and through the saturant in said container and saturant in said tank, and holders for the articles suspended from the conveyor, so that the action of gravity on the holders maintain the articles in vertical position throughout their travel through the saturant in said container and tank.

6. In apparatus for saturating long inflexible absorbent articles, in combination, a container for saturant, a tank having an opening disposed in the saturant, means for creating a vacuum in said tank, a conveyor for carrying articles through the saturant in said container and through the saturant in said tank, holders for the articles carried by said conveyor, said holders being arranged to reverse the articles end-for-end during their passage through the saturant.

7. In apparatus for saturating absorbent articles, in combination, a container for saturant, a tank having an opening immersed in the saturant in the container and thus liquid-sealed against the atmosphere, a foam chamber communicating with said tank, means for creating a vacuum in said foam chamber and said tank, and means for passing the articles to be saturated through the liquid seal and into and through said tank.

8. In apparatus for saturating fibrous conduits, in combination, a container for saturant, a tank of a length sufficient to accommodate a maximum barometric column of saturant with an evacuated space thereabove, said tank being open at one end and closed at the other and having the open end immersed in the saturant in the container and thus liquid-sealed against the atmosphere, a foam chamber communicating with said tank, means for creating a vacuum in said foam chamber and said tank, and an endless conveyor provided with holders for the fibrous conduits arranged to pass through the saturant in said container, through the seal, and into and through the saturant in said tank, said holders maintaining the articles in vertical position throughout their travel through the saturant in said container and tank.

9. In apparatus for saturating fibrous conduits, in combination, a container for saturant, a tank of a length sufficient to accommodate a maximum barometric column of saturant with an evacuated space thereabove, said tank being open at one end and closed at the other end and having the open end immersed in the saturant in the container and thus liquid sealed against the atmosphere, a vacuum pump communicating with the top of said tank, an endless conveyor provided with holders for the fibrous conduits arranged to pass through the saturant in said container through the seal up through the saturant in said tank into and through the evacuated space thereabove, down through the saturant in said tank, and into and out of the saturant in said container, holders for the fibrous conduits suspended from the conveyor, said holders maintaining the conduits in vertical position throughout their travel through the saturant in said container and tank, and means for spraying the fibrous conduits with saturant while in the evacuated space in said tank.

10. An apparatus for saturating absorbent articles in combination, a container for bituminous saturant, a tank having one end immersed in the saturant in said container, means for creating a vacuum above the body of saturant in said tank, means for passing absorbent articles through the saturant, means communicating with said tank for collecting and decomposing foam containing bituminous material and means for returning bituminous material from said last mentioned means to said tank.

11. An apparatus for saturating fibrous conduits with bituminous material, in combination, means for continuously passing the conduits through a drying zone, means for continuously passing the dried conduits through a body of bituminous saturant, means for maintaining said body of bituminous saturant under vacuum, means communicating with said body of bituminous saturant for collecting foam containing bituminous material removed from said body of saturant, means for returning the bituminous material recovered by the foam collecting means to the said body of saturant, means for continuously removing the saturated conduits from the saturant and means for continuously moving the saturated conduits through a drying zone.

12. An apparatus for saturating individual inflexible articles, in combination, a container for saturant, a tank of a length sufficient to accommodate a maximum barometric column of saturant, said tank being open at one end and closed at the other and having the open end immersed in the saturant in the container and thus liquid sealed against the atmosphere, means for subjecting the saturant in said tank to vacuum conditions, a conveyor for the individual articles arranged to pass through the saturant in said tank and to carry the articles so that they are subjected to the said vacuum conditions and means for spraying the articles with saturant while subjected to said vacuum conditions.

13. In apparatus for saturating inflexible fibrous conduits, in combination, a container for saturant of a depth such that when the inflexible fibrous conduits are carried down to a point near the bottom of the container they are submitted to a head of saturant such that the pressure head on the conduits is substantially above atmospheric pressure, a tank having an opening immersed in the saturant in said container and thus liquid sealed against the atmosphere, and a conveyor provided with holders for said fibrous conduits, said conveyor being disposed to enter the upper portion of the body of saturant in said container, pass down through the saturant in said container to a point near the bottom of said container, then pass up through the saturant in said container, through the liquid seal for said tank, into and through the body of saturant in said tank, and then again pass down through the saturant in said container to a point near the bottom of said container.

14. In apparatus for saturating absorbent articles, in combination, a container, a conveyor within the container, means for maintaining a body of saturant in the container with an evacuated space thereabove, means for feeding articles to be saturated to the conveyor, means for spraying the articles while carried by said conveyor through the evacuated space in the container, and means for discharging the saturated articles from said container.

15. In apparatus for saturating absorbent articles, in combination, a container, an endless conveyor disposed within the container, means for maintaining a body of saturant within the container, means for feeding articles to be saturated to the endless conveyor within the container, means for spraying the articles with saturant as they are carried by said conveyor, means for creating a vacuum in said container, and means for discharging the saturated articles from the container.

16. In apparatus for saturating fibrous conduits, in combination, a container, means for successively feeding a plurality of conduits to be saturated into the container, means for maintaining a body of saturant with an evacuated space thereabove in the container, means for moving the conduits through the body of saturant within the container and through the evacuated space, means for spraying the conduits with saturant while in the evacuated space, and means for discharging the saturated conduits from the container.

17. Apparatus for saturating fibrous conduits comprising a container for saturant, a tank closed at one end and having the other end open and immersed in the saturant in said container, means for passing saturant from the container and spraying the same onto the surface of the saturant in said tank, and a vacuum pump communicating with said tank for maintaining a barometric leg of saturant thereon with an evacuated space thereabove.

18. In apparatus for saturating fibrous conduits, a tank, means for maintaining a column of saturant therein with an evacuated space thereabove, a foam chamber communicating with said evacuated space in said tank, a vacuum pump communicating with said foam chamber, and means for passing saturant from the bottom of said tank, and spraying the same on the surface of the saturant in said tank.

STUART P. MILLER.